United States Patent [19]

Belanger

[11] 3,846,942
[45] Nov. 12, 1974

[54] ROTARY FINISHING WHEELS
[75] Inventor: James A. Belanger, Livonia, Mich.
[73] Assignee: Belanger, Inc., Northville, Mich.
[22] Filed: Dec. 14, 1973
[21] Appl. No.: 424,777

Related U.S. Application Data
[62] Division of Ser. No. 339,352, March 8, 1972, which is a division of Ser. No. 155,733, June 23, 1971, abandoned.

[52] U.S. Cl. .................................................. 51/334
[51] Int. Cl. .............................................. B24b 9/02
[58] Field of Search ........................... 51/332–338; 15/230–230.18, 175–182

[56] References Cited
UNITED STATES PATENTS

| | | | |
|---|---|---|---|
| 1,897,971 | 2/1933 | Johnston | 51/337 |
| 2,035,042 | 3/1936 | Bridgman | 51/337 |
| 2,423,992 | 7/1947 | Nordgren et al. | 51/334 |
| 2,597,421 | 5/1952 | White | 51/334 |
| 3,455,068 | 7/1969 | Belanger | 51/337 |
| 3,541,740 | 11/1970 | Radik | 51/332 |
| 3,621,622 | 11/1971 | Belanger | 51/337 |
| 3,685,217 | 8/1972 | Belanger | 51/337 |

*Primary Examiner*—Othell M. Simpson
*Attorney, Agent, or Firm*—Whittemore, Hulbert & Belknap

[57] ABSTRACT

The rotary finishing wheel comprises a rotatable hub structure having an axis and includes an axially extending hub sleeve having a pair of radially outwardly extending flanges and a series of circumferentially spaced and axially extending mounting pins carried on the flanges adjacent the outer periphery thereof. Pack units are mounted on the pins and extend radially outwardly of the hub structure. Each of the pack units comprise a flap-like member of fill material presenting a radially outer finishing portion, and a mounting member distinct from the flap-like member for mounting the latter on one of the pins of the hub structure between the flanges. The mounting member is a relatively rigid unitary one having a single radially inner and axially extending portion or body formed with an opening of one of several shapes which telescopes axially onto one of the pins and wraps around the pin so that undesirable radial separation between the pin and the rigid body of the pack unit is prevented. The mounting member includes a pair of integral, radially outer and outwardly extending arm formations on the inner portion or body and coextensive therewith in overall length. The radially inner portion of the flap-like member is located between and is secured to the arm formations by staples or other fastening elements which clamp the arm formations against the fill material therebetween. The pack units may be mounted for pivotal movement on the pins of the hub structure and may be readily removable therefrom for replacement upon expected wear by the separation of component parts of the hub structure.

18 Claims, 8 Drawing Figures

PATENTED NOV 12 1974

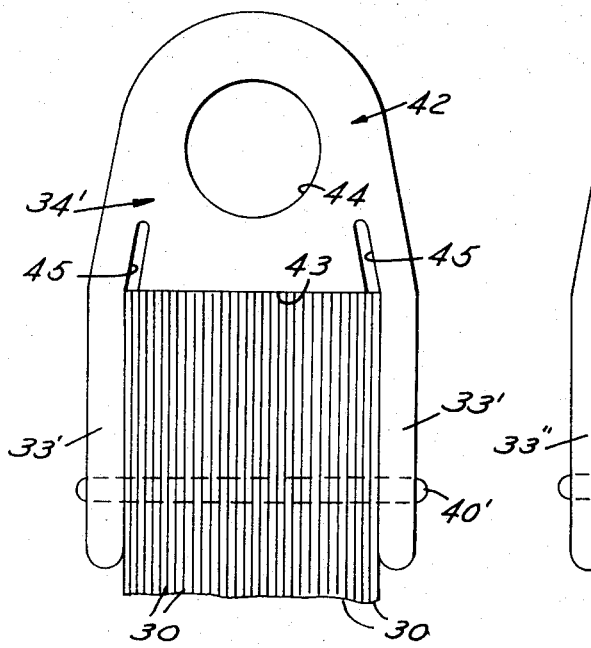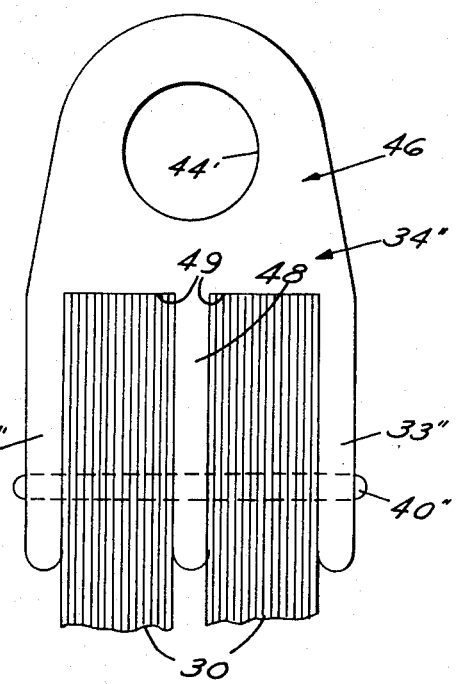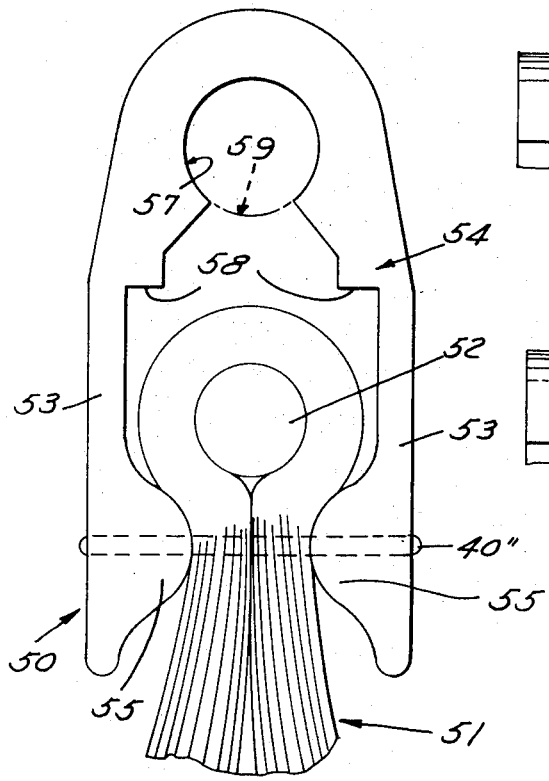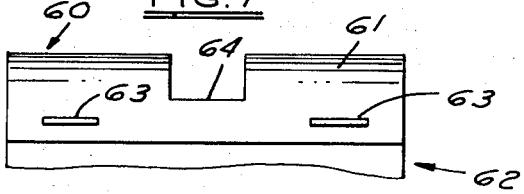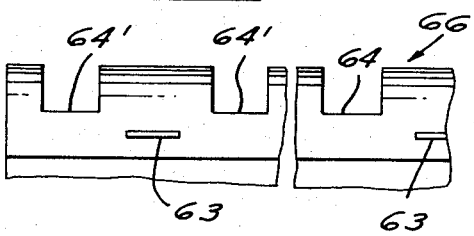

3,846,942

ROTARY FINISHING WHEELS

CROSS-REFERENCE TO RELATED APPLICATIONS

This is a division of application Ser. No. 339,352, filed Mar. 8, 1973 which is a division of application Ser. No. 155,733, filed June 23, 1971, now abandoned.

My co-pending application, Ser. No. 885,734, filed Dec. 17, 1969, now U.S. Pat. No. 3,685,217 of Aug. 22, 1972, shows and describes a rotary finishing wheel or tool, in which a cylindrical hub structure is, in certain illustrated embodiments, generally similar to the hub structure of the present invention, although not of a type characterized by separable disc or flange parts; and the abrasive sheet pads or packs shown and described in that application, although pivotally mounted on certain hub-carried pins, are individually of a nature very different from those herein shown, described and claimed.

Another of my co-pending applications, Ser. No. 857,885, filed Sept. 15, 1969, now U.S. Pat. No. 3,626,646 of Dec. 14, 1971, relates to abrasive sheet packs pivoted on pins of a solid section hub structure by means of a separate unitary retainer device having portions which loop or partially wrap around axially spaced portions of a pivot pin.

My later co-pending application, Ser. No. 156,008, filed June 23, 1971, now U.S. Pat. No. 3,772,833 of Nov. 20, 1973, discloses another version of an axially separable confining flange or end plate-type hub structure adapted for the use of abrasive units generally similar to those herein disclosed, also a simple hand-tool or facilitating the separation of the end plates or flanges of the hub structure for assembly and, if needed, replacement of worn units.

BACKGROUND OF THE INVENTION

1. Field of the Invention

The replaceably hinged flexible pad-like abrasive units or packs of the present invention find application, preferably but not necessarily in association with a cylindrical hub structure of the nature herein disclosed, in various types of buffing wheels, polishing wheels, non-solid type grinding wheels, and other related applications for the rough or finish abrasive working, brushing, burnishing, or polishing of metal or other rigid parts.

2. Description of the Prior Art

Abrasive pack-type units of a nature and use only generally similar to those disclosed herein are the subjects matter of prior patents to Block, U.S. Pat. No. 2,804,730 of Sept. 3, 1957; Peterson, U.S. Pat. No. 2,984,053 of May 16, 1961; Block, U.S. Pat. No. 3,058,269 of Oct. 16, 1962, and Burns, U.S. Pat. No. 3,533,198 of Oct. 13, 1970. However, they all lack disclosure of structural features and functional attributes such as are referred to in the above Abstract and will be hereinafter described in detail.

My own U.S. Pat. Nos. 3,455,068 of July 15, 1969, and 3,535,833 of Oct. 27, 1970, respectively bearing co-pending parent and divisional application status, also relate to rotary finishing tool structure.

SUMMARY OF THE INVENTION

The improved wheel of the invention comprises a cylindrical hub structure of a very simple but rugged nature capable of being inexpensively mass-produced in the main of stamped parts. It is inexpensively assembled both in regard to the ub components and the application of the abrasive packs to the hub, and affords a fast and easy dismantling of the hub for removal and replacement of any one or all of the abrasive packs. The latter, as pivotally mounted on individual transverse pins spanning the axial space between end flange members of the hub structure, one of which members is removable from the hub for access to the pack, are also capable of inexpensive mass-production. Hub mounting parts for the packs are in the form of sections of extruded aluminum or plastic stock sawed transversely to afford individual identical, relatively rigid mounting members. These members are provided with cylindrical through-holes or quasi-cylindrical re-entrant key-hole type through-openings, either of which types removably telescope axially with reasonable clearance on the transverse pivot pins of the hub for a hinged pack connection which also restrains the pack and its mount against undesirable radial movement relative to the hub structure under high speed operation and vibration.

The extruded-type mounting sections also present integral stop portions against which radially inner ends of the respective assembled sheet packs may be abutted, thus insuring an outer circumferential surface continuity of the abrasive structure as a whole.

BRIEF DESCRIPTION OF THE DRAWINGS

FIG. 4 is a fragmentary view similar to FIG. 3 of an alternative embodiment presenting an uninterrupted cylindrical pivot and retainer hole in the body of the mounting member;

FIG. 5 illustrates another optional modification, similar to that of FIG. 4 save for the fact that the abrasive unit may incorporate two or more similar packs clamped by the mounting extrusion, being separated from one another by a central rib portion of said extrusion;

FIG. 6 is a fragmentary axial end view, generally similar to FIGS. 4 and 5, of still another modification of the abrasive sub-assembly, in which pack-clamping arm projections of the mounting member are shown as radially restraining a loop-type abrasive pad or pack unit, an alternative pivot hole arrangement being indicated in dot-dash line;

FIG. 7 is a fragmentary side elevational view of an adaptation of the sheet pack assembly for use on a hub structure of the type disclosed in my co-pending application, Ser. No. 885,734, now U.S. Pat. No. 3,685,217, identified above; and FIG. 8 is another embodiment of the same type as, and for the same purpose as the embodiment of FIG. 7.

DESCRIPTION OF PREFERRED EMBODIMENTS

Figure 1:
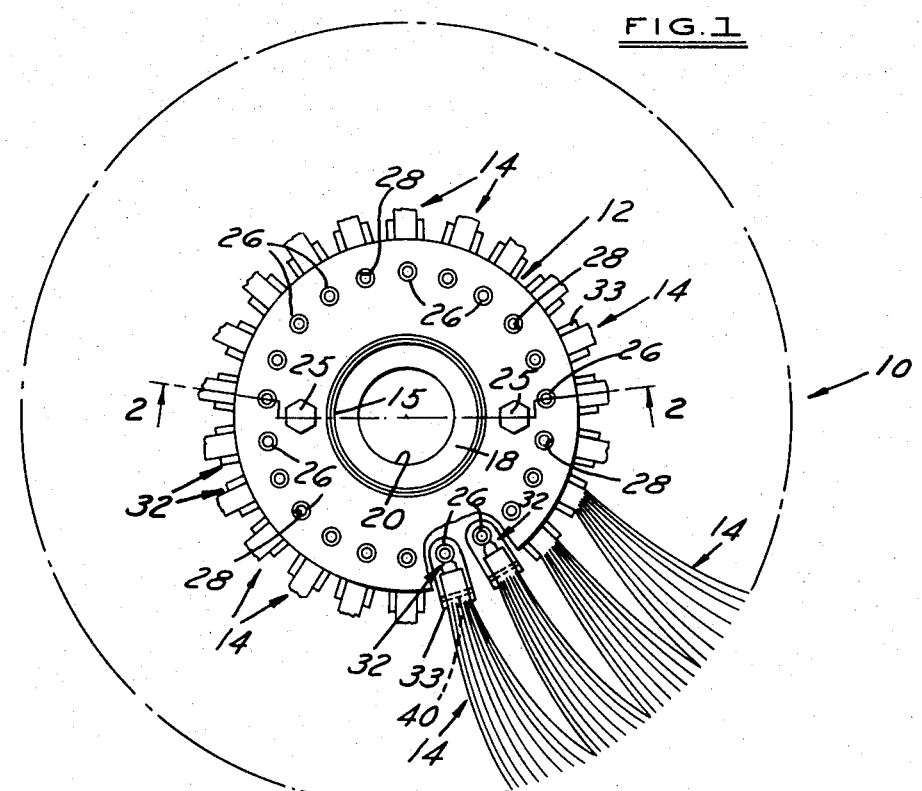
FIG. 1 is a fragmentary axial end view, as in the direction of the arrow of FIG. 2, of a typical abrasive finishing wheel constituted in multiple by one version of the improved replaceable abrasive pack and by the improved cylindrical hub structure of the invention.
Figure 2:
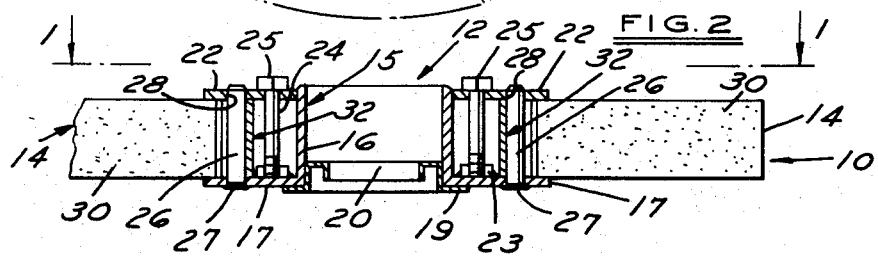
FIG. 2 is a fragmentary view in generally horizontal cross section on broken line 2—2 of FIG. 1.

FIGS. 1 and 2 of the drawings illustrate a typical abrasive work finishing wheel or rotary tool, generally designated by the reference numeral 10, which is made up in general of an axially central and radially flanged tubular driving hub unit or structure 12, and a multiplicity of identical replaceable abrasive sheet pack units 14, pivotally mounted to the hub structure 12 in equal circumferential spacing about the latter. The number may, of course, vary, but in general and by preference the circumferential array of the abrasive units 14 is such as to afford a substantially continuous circumferential wheel surface characteristic at the outer extremities of the abrasive packs 14.

As shown in FIGS. 1 and 2, the cylindrical hub structure 12, which is contemplated for preferred use in association with any of the abrasive pack forms dealt with herein, comprises an axially inner sleeve component 15 made up of an inner tubular member 16 and a radially outwardly extending flange member 17 fixedly mounted concentrically or coaxially upon one axial end of said sleeve. The latter may be in the form of a one-piece stamping of a suitably thick gauge sheet metal, of which the disc-like flange portion 17 is an integral part; or, in the alternative the sleeve unit 15 may comprise an inner cylindrical sleeve part 16 to an end of which a separate disc or flange component in the form of a separate annulus of appropriate inner and outer diameter is welded in a flush relation. A separate inverted cup-like, internal bearing part or adapter 18, preferably a sheet metal stamping, has a cylindrical outer surface 18' which is snugly telescoped into the bore of sleeve part 16, preferably with a forced fit insuring a fixed relationship of element 18 to the sleeve unit 15. The member 18 presents an integral, radially outwardly extending annular stop flange 19 overlapping the sleeve disc or flange part 17; and an axial outward flanging of member 18 at 20 presents a bore at which the sleeve component 15 is to be drivingly engaged with a power shaft or the like (not shown).

Sleeve unit 15 is completed by a second and removable annular flange or disc element 22 whose circular central bore is sized to telescope with relatively free clearance over the axial end of sleeve 16 opposite the flanged end 17 of the latter. The outer end of sleeve element 16 is chamfered to enable an easy application of the disc 22 thereto.

At points on diametrically opposite sides of the sleeve unit 15 its permanent flange 17 is shown as having a pair of hex-headed nuts 23 secured fixedly thereto, as by welding; or, in the alternative, the flange may be drilled and tapped. In either case an internally threaded securement means is formed and the purpose is to threadedly receive the end of a machine bolt or stud or fastener 24, whose hex-head 25 bears against the outer end axial surface of removable flange disc 22. This holds the latter in a confining engagement with the side of the abrasive sheet pack 14, later to be described in detail, but with insufficient axial end pressure on the latter in the direction of flange 17 to prevent a free pivotal action of the individual pack units 14 contemplated by the invention.

A pivotal axis for each of the abrasive units 14 is provided by a pin 26 extending axially through the space between disc or flange components 17, 22 of the hub sleeve sub-assembly 15. These pins, as uniformly distributed about and adjacent the periphery of the cylindrical hub structure 12 (one for each pack unit 14), are fixedly mounted on sleeve flange 17, as by welding the pins at 27 (FIG. 2) in holes in said flange 17, the pins extending through the transverse space between flanges 17 and 22 and parallel to the axis of the wheel, i.e., at 90° to the flanges. The ends of the pins 26 opposite their welded anchor connections are chamfered for ready reception in a similar number of similarly distributed holes 28 in the removable flange 22.

Thus, the flange 22, as mounted at its series of holes 28 in a telescoped relation to both the hub sleeve part 16 and the pivot pins 26, as shown in FIG. 2, and secured in this relationship by the bolts or studs 24, completes a cylindrical hub structure 12 which is dually flanged to receive the abrasive packs 14. The structure is of a very rugged nature, and is obviously very simply and inexpensively constituted as to its parts. When it is desired to remove and replace one or more of the packs 14, this is accomplished easily and with a minimum of wheel "down" time by simply removing the two bolts 24, taking off the flange disc 22, lifting out the abrasive pack or packs to be replaced, and restoring and clamping the disc to its operative position over the reconstituted group.

Figure 3:
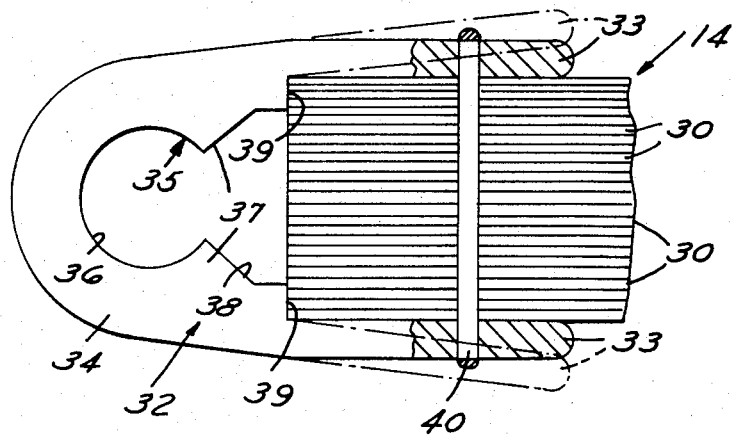
FIG. 3 is a fragmentary end view in enlarged scale of a replaceable pad-like abrasive sheet pack and its extruded metal mounting member, in accordance with the embodiment of the invention also illustrated in FIGS. 1 and 2.

The embodiment of pack unit 14 shown in FIGS. 1, 2 and 3 is, as indicated above, in the form of a stack of identical individual abrasive or equivalent type finishing sheets 30, all of a radially elongated rectangular shape. They may be of any suitable fill material indicated for the purpose, such as abrasive coated, emery-type cloth or fabric, leather, sisal and the like, and may be specially treated, if required, in a manner known to the art. Likewise, radially inner ends of the sheets may be bonded together, as by an appropriate mastic, to impart a rigid, block-like characteristic to those ends.

Each of the pack units 14, in the embodiment of FIG. 3, is pivotally mounted to wheel hub structure 12 by a single rugged unitary sheet mounting and pivoting part 32 which is individual to, and a second component of, the pack unit 14. By preference, each such part 32 is in the form of a transversely sawed rigid section of an elongated extrusion of aluminum, for example, or other extrudable material, such as any one of a number of synthetic plastics. Such section 32 is continuous and uninterrupted in its axial length, which equals that of the stack illustrated in FIG. 2, so that it and the pack assembly or unit as a whole are axially confined quite closely at opposite sides thereof by hub flanges 17 and 22, yet are free to pivot individually in action relative to hub structure 12.

More specifically in reference to FIG. 3, the clamping member 32 is of a generally forked outline in cross-section in a plane normal to its pivotal axis. It presents a pair of stack clamping arms or furcations 33 which generally parallel one another, although being slightly divergent in an original free, uncompressed position of the arms 33, such as is indicated in dotted line in FIG. 3. Arms 33 merge integrally into a somewhat block-like radially inner body portion 34 of the member 32 at which it pivotally mounts the pack unit 14 to the hub assembly 12 of wheel 10, more particularly, to an individual transverse pivot pin 26 of hub sleeve member 15, as depicted in FIGS. 1 and 2.

For this purpose, the body 34 of each pack-clamping and pivoting member 32 is formed to provide an opening, generally designated 35, which may be described as being key-hole shaped. That is, the opening comprises a radially inner portion 36 of quasi-cylindrical outline, in excess of 180° and less than 360° extent, so as to present re-entrant projections at 37 which wrap radially outwardly around the pivoting pin 26, the radius of the hole portion 36 only slightly exceeding that of the pin. Thus, the pivoting and clamping member 32 may be freely telescoped axially onto the end of a pin 26 in initial assembly and subsequent replacement operations. The re-entrant key-hole nature of opening 35 prevents significant radial shift of the pad unit 14 in relation to hub structure 12, notwithstanding a relatively free fit on the pin, and imparts a degree of flexibility to member 32 in regard to its clamp arms 33.

Relatively wide mouth portions 38 of the openings 35 radially outwardly of the projections 37 are shaped to afford substantially 90° shoulder surfaces 39, which are radially inwardly abutted by the end of the stack of sheets 30, thus positively and accurately positioning the latter for a uniform continuous outer circumference of the wheel 10. With the sheets so positioned between the arms or furcations 33, the latter are clamped strongly against the stack by heavy duty U-shaped staples 40, as driven through the arms 30 with the staple prongs clinched tightly against the outer surface of one of the arms. For a pack unit 14 of the limited axial extent appearing in FIG. 2, one such staple will usually suffice; for greater axial widths a plurality of staples will be required; and it is to be understood that rivets or other types of rigid locking means are contemplated for the purpose.

Two alternative types of stack mounting member are illustrated in FIGS. 4 and 5 of the drawings, both characterized by a fully cylindrical pivot hole, as distinguished from the wrap-around key-hole type hole characteristic of FIG. 3. To the extent that certain features of the pack's clamping and pivoting body member, as specially designated 42 in FIG. 4, correspond with features common to the corresponding body member 32 of FIG. 3, they are designated by corresponding reference numerals, primed, and further description thereof is dispensed with. Similarly corresponding features appearing in FIG. 5, as well as to some extent in FIG. 6, are designated by corresponding reference numerals, again or double primed.

Thus, a single pack abutment surface 43 of the pack unit 42 of FIG. 4 is substituted for the stop shoulders 39 of FIG. 3 in view of the fact that the unit's pivot hole 44 is fully cylindrical in this case. Relief slots 45 are formed between the ends of surface 43 and the clamp arms 33', thus imparting a desired measure of increased flexibility to those arms in clamping the stacked sheets 30.

As illustrated in FIG. 5, the pack's pivoting and clamping construction is similar to that of FIG. 4, the body thereof being generally designated 46. In this case, two or more like but separate stacks of sheets 30 are clamped between outer fork arms or furcations 33'' of a set of three or more such arms; and an axially inner arm 48 of the same thickness and radius separates the pack sheet components, affording a backing for clamping force exerted by the staple means 40' on arms 33''. The stacks radially inwardly abut stop surfaces 49 between the arms.

A further optional embodiment of the pack unit which is shown in FIG. 6 and is specially designated 50 differs in one respect from those previously described in that the abrasive sheet component 51 thereof is constituted by sheets superposed in a stack and folded upon themselves in a looped fashion about a transverse shaping and restraining pin 52 in the bight of the loop, the loop received in a laterally enlarged space between parallel clamp arms or furcations 53 of the pivotal mounting body, here generally designated 54.

Each of the arms 53 is formed on its inner surface to provide a nose projection 55, and when the arms are drawn together in clamping by the taple means 40''', their noses 55 take against zones of the sheets just radially outwardly of the restricted neck of the loop bight of the pack. The arms 53 thus of themselves strongly restrain the abrasive pack or pad 51 against radial movement, centrifugal or otherwise, in relation to the stack clamping and pivoting member 54.

The latter is shown in FIG. 6 as being provided with a key-hole shaped pivoting opening 57, similar to the embodiment of FIG. 3. It is also provided with stop shoulders 58 in the event it should be desired to mount a plain stack of abrasive sheets (as in FIGS. 3, 4 and 5) in lieu of the looped type. As a further alternative, the pivotal opening may be in the form of a fully true cylindrical hole, as indicated in dot-dash line in FIG. 6 and designated 59.

FIG. 7 illustrates an adaptation of the composite pack structure of the invention for use on a hub structure having a pair of opposed end plates and an intermediate plate spaced axially between the same, the general nature of which is illustrated and described in my co-pending application, Ser. No. 885,734, now U.S. Pat. No. 3,685,217, to which reference may be made; and for the purpose of simplicity, such plate means are not shown, although it is contemplated that features of removability as described above may be incorporated.

Thus, FIG. 7 illustrates a pack unit or assembly for this purpose, as generally designated by the reference numeral 60, to comprise an extruded pivotal mounting body 61, to which the superposed sheets of an abrasive pack 62 are secured by staple means 63, in the manner described above. The extrusion is centrally apertured at 64, mid-way of its length, to provide a rectangular notch adapted to telescope radially inwardly over an intermediate plate or flange component (not shown) of the hub of the unit, end plates or flanges of the latter being, of course, disposed at opposite ends of the part 61.

In the embodiment of FIG. 8 the structure is basically the same, hence corresponding numerals are employed, save for the fact that the assembly 66 of that figure is relatively more elongated in nature, hence is provided with a requisite number of notches, specially designated 64' in equally spaced relation to one another along its axial length.

What is claimed is:

1. A rotary finishing wheel comprising a rotatable hub structure having an axis and a series of circumferentially spaced and radially extending pack units carried by said hub structure, said hub structure comprising a pair of axially spaced apart flanges arranged in parallel relationship and which extend radially outwardly from said axis, means for maintaining said flanges in said axially spaced relationship, and a circumferential series of elongated mounting pins carried by said flanges adjacent the outer periphery thereof for mounting said pack units, one mounting pin for each of said pack units, each of said pack units comprising a flap-like member of fill material presenting a radially outer portion adapted to engage a workpiece, and a rigid mounting member distinct from said flap-like member for thus mounting the latter on the corresponding pin of the hub structure, said rigid mounting member providing a single radially inner and axially extending rigid portion having an axial aperture of at least part cylindrical outline for telescopingly mounting said pack unit on the corresponding pin, said inner rigid portion surrounding said axial aperture including restricting means circumferentially extending and wrapping around said pin to prevent undesirable radial separation between the pin and said mounting member, and a radially outer and outwardly extending arm formation on said inner rigid portion and coextensive therewith in overall axial length, said flap-like member having a radially inner portion secured to said arm formation.

2. The rotary finishing wheel defined in claim 1, in which said axial aperture and said restricting means of each mounting member have a key-hole outline which telescopes the corresponding mounting pin of the hub structure at an enlarged, radially inner portion of the outline and wraps radially outwardly and re-entrantly about such pin at a radially inner, restricted portion of the outline.

3. The rotary finishing wheel defined in claim 1, in which said axial aperture and said restricting means of each mounting member have a fully cylindrical outline which telescopes the corresponding mounting pin of the hub structure.

4. The rotary finishing wheel defined in claim 1, in which said pack units are mounted on said pins, with a small clearance provided between each of said pins and the corresponding mounting member, so as to be capable of individual swing about said pins.

5. The rotary finishing wheel defined in claim 4, in which there are at least two integral radially outer and outwardly extending arm formations on said inner rigid portion of each mounting member and coextensive therewith in overall axial length, said radially inner portion of said flap-like member being located between arm formations, and fastening means penetrating said arm formations and said radially inner portions of said flap-like member to clamp said arm formations against said radially inner portion of said flap-like member.

6. The rotary finishing wheel defined in claim 5, in which the junction of said arm formations with said inner portion of said mounting member of each pack unit is defined by an abutment surface engageable with the inner end surface of said flap-like member, said abutment surface providing a stop for locating the latter in said mounting member.

7. The rotary finishing wheel defined in claim 5, in which each mounting member is continuous and uninterrupted throughout the axial length thereof, including said apertured inner portion and its integral arm formations.

8. The rotary finishing wheel defined in claim 5, in which said integral arm formations of each mounting member are each continuous and uninterrupted throughout the axial length thereof.

9. The rotary finishing wheel defined in claim 5, in which said integral arm formations of each mounting member are each continuous and uninterrupted throughout the axial length thereof, said apertured inner portion being provided with at least one notch.

10. The rotary finishing wheel defined in claim 5, in which said inner portion and said arm formations of the mounting member of each pack unit are in the form of a relatively rigid transverse section of extruded material.

11. The rotary finishing wheel defined in claim 5, in which the oppositely facing inner surfaces of said arm formations of each mounting member are provided with laterally extending projections which engage and compress the radially inner portion of the corresponding flap-like member.

12. The rotary finishing wheel defined in claim 5, in which there is a further arm formation integral with the inner portion of each mounting member, said fill material being divided into a pair of stacks, with each stack being separated by said further arm formation.

13. The rotary finishing wheel defined in claim 4, in which said hub structure includes a cylindrical hub sleeve paralleling said axis, said flanges being located on opposite axial ends of said hub sleeve which forms part of said means for maintaining said flanges in said axially spaced relationship, said series of pack units being located radially outwardly of said hub sleeve.

14. The rotary finishing wheel defined in claim 13, in which one of said flanges is fixed to one axial end of said hub sleeve, said pins being fixedly secured to said one flange and extending in a direction parallel to said axis, the other of said flanges being removable and having a circumferential series of holes matingly telescoped with the respective pins and an axial bore telescoped on the other axial end of said hub sleeve, and readily releasable means located parallel to and radially outwardly of said hub sleeve for securing said other flange in a fixed but removable and replaceable relation to said hub sleeve and to said one flange to so confine said packs therebetween.

15. The rotary finishing wheel defined in claim 14, in which said releasable securing means comprises axially extending bolt and nut type means paralleling said axis and located between said hub sleeve and said mounting pins.

16. The rotary finishing wheel defined in claim 14, wherein said readily releasable means comprises a pair of internally threaded securement means provided on said fixed flange, said securement means being located on opposite sides of said axis, a pair of openings provided in said removable flange which are aligned with said internally threaded securement means, said releasable means further comprising a pair of axially extending threaded fasteners extending through said openings provided in said removable flange and into said internally threaded securement means, each of said fasteners having an enlarged head on one end engageable with the outside surface of said removable flange and threads on the other end threadedly engageable with the internally threaded securement means on said fixed flange, said fasteners being spaced from said pins and pack units and from said hub sleeve.

17. The rotary finishing wheel defined in claim 16, wherein said pair of internally threaded securement means are in the form of a pair of internally threaded nuts welded to said fixed flange in the space between said fixed and removable flanges.

18. The rotary finishing wheel defined in claim 13, wherein a power shaft adapter is provided for said hub sleeve, said adapter having a cylindrical outer surface engageable with the inside surface of said hub sleeve, one end of said adapter being provided with a stop flange engageable with the outside surface of said fixed flange, and the other end of said adapter extending away from said hub sleeve and having an axial bore provided therein.

* * * * *